F. BRYLA.
POTATO DIGGER.
APPLICATION FILED MAY 25, 1914.
1,143,886.
Patented June 22, 1915.
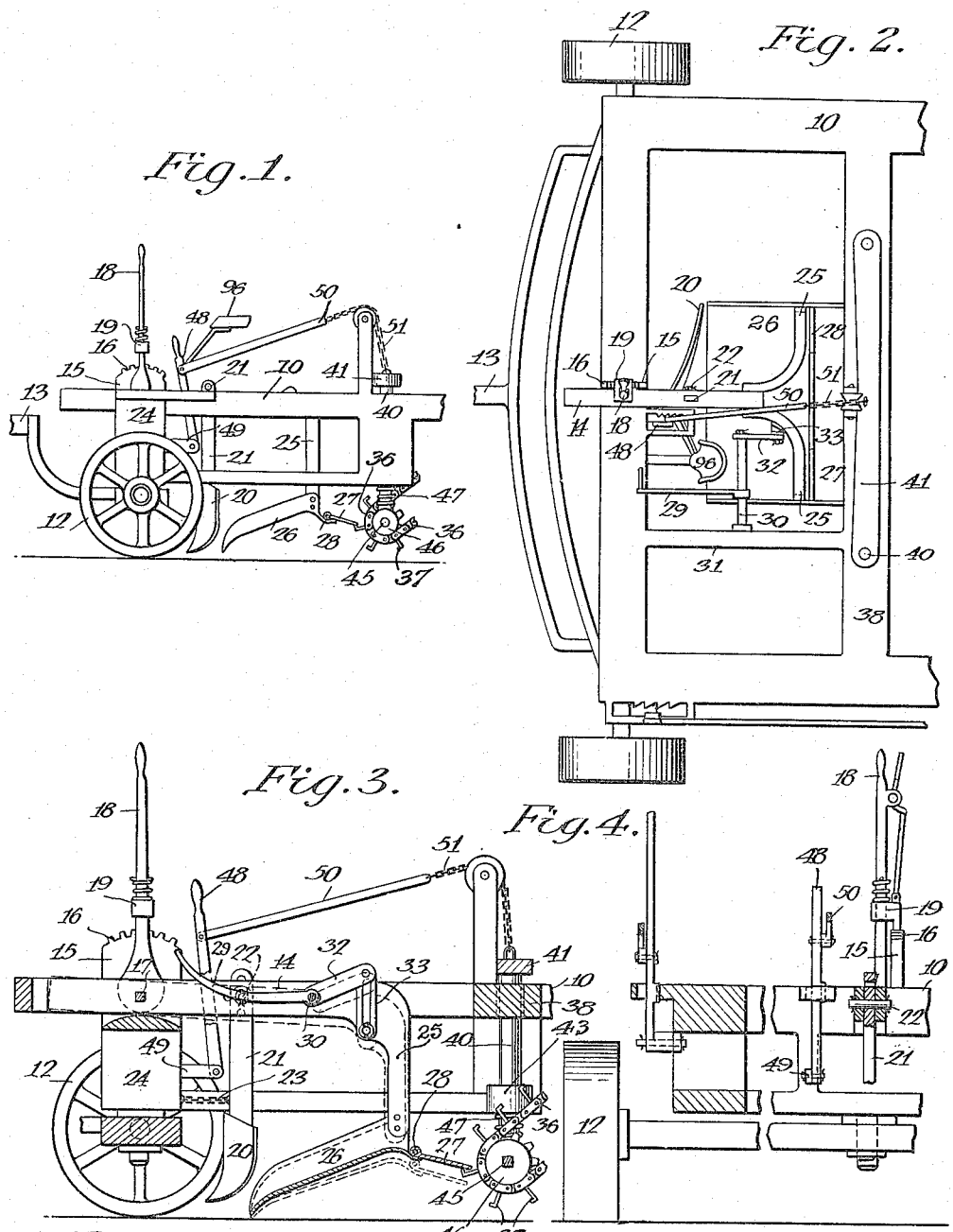
Witnesses:
G. Notes
A. Hollander
Inventor:
Frank Bryla
By A. M. Wilson
Attorney

UNITED STATES PATENT OFFICE.

FRANK BRYLA, OF WESTFIELD, MASSACHUSETTS.

POTATO-DIGGER.

1,143,886. Specification of Letters Patent. Patented June 22, 1915.

Application filed May 25, 1914. Serial No. 840,773.

*To all whom it may concern:*

Be it known that I, FRANK BRYLA, a subject of the Emperor of Austria-Hungary, residing at Westfield, in the county of Hampden and State of Massachusetts, have invented certain new and useful Improvements in Potato-Diggers, of which the following is a specification.

This invention relates to certain new and useful improvements in potato diggers.

The primary object of this invention is to provide a horse or motor-driven implement adapted for excavating potatoes from the soil during the forward movement of the implement.

A still further object is to provide a vehicle provided with an adjustable potato plow and shovel and a rearwardly-positioned adjustable potato conveyer, the movable parts being operable from power derived from the traction wheels of the device.

With these general objects in view and others that will appear as the nature of the invention is better understood, the same consists in the novel combination and arrangement of parts hereinafter fully described, illustrated in the accompanying drawings, and pointed out in the appended claims.

In the drawings forming a part of this application and wherein like numerals of reference designate corresponding parts throughout the several views: Figure 1 is a side elevation of the device. Fig. 2 is a top plan view thereof. Fig. 3 is an enlarged vertical longitudinal sectional view of the device. Fig. 4 is an enlarged transverse vertical sectional view of a portion of the same taken substantially through the plow shaft connection.

Referring more in detail to the drawings, the implement broadly consists of the rectangular frame 10 provided with rear wheels and forward wheels 12, the device being drawn forward by means of the tongue 13 by either animal or motor power. At the forward portion of the frame 10 a curved supporting bar 14 is pivoted to the bracket 15 having a curved toothed rack 16 upon the top thereof, the said bar having a fixed shaft 17 therethrough which is pivotally-mounted through the said bracket 15 while a hand lever 18 also secured to said shaft 17 is adapted for tilting the supporting bar as desired and is held in its adjusted position by a spring-pressed pawl 19 engaging with the said teeth 16.

The plow 20 is positioned upon the lower end of a plow shaft 21, which shaft is mounted by means of a pin 22 to the supporting bar 14 and is connected by a chain 23 with a forward portion 24 of the framework by which construction it will be evident that a movement of the supporting bar will shift the plow while the chain 23 prevents any pivotal movement thereof when operatively engaging with the earth. The lower angular end 25 of the supporting bar has the shovel 26 rigidly attached thereto thus mounting the shovel in the rear of the plow, the same being of a greater width than the plow whereby the excavated potatoes are immediately received by the shovel. A rear plate 27 is connected by the hinge 28 to the rear longitudinal edge of the shovel 26. A foot lever 29 is secured to a stub shaft 30 revolubly-mounted upon the longitudinal brace 31 of the main frame 10 and forms the mount for a terminal crank arm 32 connected by means of the link 33 with the supporting bar 14. It will thus be seen that the plow and shovel are vertically adjustable for operating at the required depths by means of the hand lever 18 and the foot lever 29, each of which acts similarly upon the supporting bar 14.

Means (not shown) are provided over which are run opposite sprocket chains 36 having outwardly-positioned potato-engaging strips 37 which strips are hook-shaped in cross-section. A forwardly-positioned transverse bar 38 is provided with opposite perforations 39 therethrough adapted for receiving vertically-positioned shafts 40 therein, which shafts are connected at their tops and above the bar 38 by a connecting strip 41. The shafts 40 are also slidably-positioned through perforations 42 in angular brackets 43 positioned beneath the bar 38 while the lower ends of the shafts 40 are provided with journal blocks having a shaft 45 revolubly-mounted between the said blocks and provided with sprockets 46 over which sprockets the chains 36 are also adapted to run. Between the journal blocks and the brackets 43, each of the shafts 40 is provided with an encircling helical spring 47 whereby the sprocket shaft 45 is normally-positioned at its closest distance to the ground. A hand lever 48 is pivoted to a forward bracket 49 of the portion 24 of the frame work and is connected by a bar 50 and chain 51 with the strip 41, by which it will be evident that the lever 48 may be operated to elevate the sprocket shaft 45 against the springs 47 to the desired extent, which movement relaxes the conveyer formed by the sprocket chains 36 and strips 37 as well as elevating its lower receiving end.

It is to be noted that a driver's seat 96 is positioned forwardly of the frame for controlling the animals attached to the vehicle which seat is in close proximity to all of the operating levers for the various mechanisms.

While the forms of the invention herein shown and described are what are believed to be preferable embodiments thereof, it is nevertheless to be understood that various forms and modifications may be resorted to which fall within the spirit and scope of the invention as claimed.

What I claim as new is:—

1. The combination with the frame of a potato digger, of an angular supporting bar pivoted to the forward portion of the frame, a plow pivoted to said bar, a shovel rigidly-secured to the lower end of said angular bar in rear of said plow, a hand-lever, and a foot lever operatively connected to said bar.

2. The combination with the frame of a potato-digger, of an angular supporting bar pivoted to the forward portion of the frame, a plow pivoted to said bar, a shovel rigidly-secured to the angular end of said bar in rear of said plow, a hand lever, and a foot lever operatively connected to said bar, and a hinged plate mounted upon the rear end of said shovel.

3. In a potato-digger, the combination with a frame, of an angle bar pivoted thereto, a plow pivoted to said bar, a shovel secured to said angle bar in rear of said plow, means operatively connected to said angle bar for adjusting said shovel, and a hinged plate mounted upon the rear end of said shovel.

4. In a potato digger, the combination with a frame, of an angle-bar pivoted thereto, a plow pivoted to said bar, a shovel secured to said angle-bar in rear of said plow, and a foot lever having a link connection with said angle-bar for adjusting said shovel.

In testimony whereof I affix my signature in presence of two witnesses.

FRANK BRYLA.

Witnesses:
J. CHAMBERS DEWEY,
FLORENCE I. SMITH.

Copies of this patent may be obtained for five cents each, by addressing the "Commissioner of Patents, Washington, D. C."